United States Patent
Baggio

(10) Patent No.: US 7,765,889 B2
(45) Date of Patent: Aug. 3, 2010

(54) START-UP ASSISTANCE COAXIAL GEAR REDUCER WITH INCREASING RATIO UP TO DIRECT DRIVE

(76) Inventor: Jean-Marc Baggio, 24, Avenue Corneille, F-57360 Amnéville (FR)

( * ) Notice: Subject to any disclaimer, the term of this patent is extended or adjusted under 35 U.S.C. 154(b) by 852 days.

(21) Appl. No.: 10/567,919

(22) PCT Filed: Jul. 20, 2004

(86) PCT No.: PCT/FR2004/001914

§ 371 (c)(1),
(2), (4) Date: Oct. 23, 2006

(87) PCT Pub. No.: WO2005/022002

PCT Pub. Date: Mar. 10, 2005

(65) Prior Publication Data

US 2007/0039413 A1  Feb. 22, 2007

(30) Foreign Application Priority Data

Aug. 4, 2003  (FR) .................................. 03 09582

(51) Int. Cl.
*F02N 15/02* (2006.01)
*F02N 15/06* (2006.01)
*F16H 35/02* (2006.01)
*F16H 55/17* (2006.01)

(52) U.S. Cl. .............................. 74/393; 74/7 E; 74/437
(58) Field of Classification Search .................. 475/17; 123/179.1; 74/393, 7 E, 435–437
See application file for complete search history.

(56) References Cited

U.S. PATENT DOCUMENTS

| | | | |
|---|---|---|---|
| 2,061,322 A | | 11/1936 | Massa, Jr. |
| 3,077,796 A | * | 2/1963 | Johnson et al. ............... 475/13 |
| 3,730,654 A | | 5/1973 | McMahon |
| 4,604,907 A | * | 8/1986 | Morishita et al. ............. 74/7 E |
| 4,765,195 A | * | 8/1988 | Takami ....................... 74/113 |
| 4,912,993 A | * | 4/1990 | Konishi et al. ................ 74/7 E |
| 5,111,707 A | | 5/1992 | Sugiyama |

OTHER PUBLICATIONS

International Search Report; PCT/FR2004/001914; Feb. 2, 2005.

* cited by examiner

*Primary Examiner*—Tisha D Lewis
(74) *Attorney, Agent, or Firm*—Cantor Colburn LLP

(57) ABSTRACT

The invention concerns a decreasing reduction start-up phase coaxial mechanical reducer using constantly variable radius gears, with a final direct drive 1:1 ratio obtained without internal movement component.

4 Claims, 1 Drawing Sheet

START-UP ASSISTANCE COAXIAL GEAR REDUCER WITH INCREASING RATIO UP TO DIRECT DRIVE

Coaxial reduction gearset to aid with start-up having a ratio that increases up to direct drive.

The present invention relates to the field of rotary machinery requiring frequent restarts.

One problem that has been solved only in part is that of the work needed to bring the machine up to speed during the start-up phase in the course of which the reduction ratio between an input shaft and an output shaft, usually ideal for steady state operation, is inappropriate.

Gearbox, bicycle derailleur or variable-cheek pulley systems are known.

BRIEF SUMMARY OF THE INVENTION

The disadvantages with these systems are that they are complex or that they are always in operation, even during steady state operation.

What is therefore missing is a simple system with a continuously decreasing reduction ratio culminating in a final ratio of 1:1—direct drive—where there is no longer any internal moving part.

This object is achieved by a coaxial mechanical reduction gearset with a continuously decreasing reduction ratio employing a plurality of variable-radius gears for a phase of starting up a rotary machine, characterized in that said gears have uniformly varying radii, in that the reduction ratio at the end of the start-up phase is 1:1—direct drive—and in that the reduction gearset at the end of the start-up phase then no longer has any internal moving part.

Gears with variable radii and constant distance between centers are well known in the field of pumps, compressors and flow meters, but their reference or pitch curve is generally closed to allow for continuous rotation. This leads to increasing and decreasing variations in said radius, and therefore to a reduction ratio that varies in the same way.

The present invention uses gears with uniformly varying radii, leading to a reduction ratio which is also uniformly variable. On account of their design, such gears have a discontinuity in the radius preventing continuous rotation. By contrast, they are perfectly able to operate for a transient period. To optimize the useful angular amplitude, the invention in a preferred form anticipates pairs of gears able both to operate over one complete revolution, which entails symmetric gear pairs and the possibility of reengaging the teeth, also known as remeshing, after stopping at the point of the discontinuity.

These said gears are reminiscent of the shape of a portion of a spiral limited to one polar revolution with radii which, for equal curved abscissa values at the points corresponding to them, measured from the closest end, need to exhibit a constant sum equal to the distance between centers. It may be pointed out that a logarithmic spiral portion the radius of which is an exponential function of the polar angle, limited to a variation of 360° of this angle, satisfies this condition, and has the special feature that its velocity vector has an angle that remains constant with the radius.

The reduction ratio of such a pair of gears varies continuously from r/R to R/r with r and R corresponding to the minimum and to the maximum of the value of the radius, which values lie at the discontinuity.

It is sensible to have this pair of gears driven by a couple of fixed-radius pinions exhibiting a ratio of R/r. This then yields a reduction ratio that varies from $R/r \times R/r = (R/r)^2$ for the starting position, to $R/r \times r/R = 1$ on approaching the discontinuity. The large pinion and the driving gear are axially secured together in order to afford the aforementioned drive. It must be pointed out that the final gearset performs one complete revolution for a rotation R/r times as much and in the same direction as the small input pinion.

In order to produce a system which, at the end of the phase, no longer has any internal moving part, the invention provides for this common intermediate axis to be able to rotate about the axis of the small driving pinion, for example with a wheel carrier plate, with a device preventing it from rotating in the opposite direction, and for the distances between centers to have the same length. This device may be a ratchet wheel, a wedging system, a retainer, or any other system known per se. The axis of the output gear is therefore the same as that of the small input pinion, which at the end of the phase leads to the entirety rotating in direct drive with no internal relative movement.

The end of the transient phase corresponds to the end of a rotation through 360° of the variable-radius gears and of the large pinion. A rotation-blocking device, which may be positioned with no particular preference on any one of these three wheels, then stops the mechanism and the whole entity then rotates about the common input and output axis. Temporary deactivation of this device allows the system to reposition itself in the starting position for a further transient phase, which is once again stopped after it has rotated through another 360°. It is also possible to maintain permanent blocking at the end of the phase and to return partially or fully to the transient phase by rotating the input pinion in the opposite direction if the output gear is able also to rotate in the opposite direction, or by rotating the intermediate axis in the direction of operation with the output gear blocked, the input pinion then rotating in the opposite direction to the direction in which it previously rotated.

Another way of blocking the end of the transient phase may be achieved without the use of a dedicated device if the final overall transmission ratio becomes slightly step-up because the system then encourages direct drive shortly before the discontinuity. This is achieved by choosing the ratio of the driving pinions slightly smaller than R/r. Unblocking in order to reposition the system in the starting position is achieved by a device which provides the small necessary amount of additional internal rotation.

The next paragraph deals with the first and second derivatives of the radius of the gears with respect to the polar angle at the point lying on their pitch curve.

The variation in radii of the gears may be uniform in order to generate a uniform variation in the reduction ratio, but may also be modulated as a function of their rotation in order to obtain different rates of variation of said ratio. That may be dependent on the input torque when such torque is variable. A bicycle bottom bracket assembly for example receives a different torque according to the position of the cranks, the torque being maximum when these are horizontal and practically zero at top dead center and bottom dead center. In this case, the reduction ratio decreases more quickly when the available torque is higher. The general shapes of the gears are still spirals, but on which there are local variations in radius.

To improve the balance of the device it is possible to increase the number of wheels other than the input pinion by distributing them in a circle about the common input and output axis and offsetting the variable-radius gears longitudinally. That makes it possible also to increase the amount of torque that can be transmitted.

BRIEF DESCRIPTION OF THE DRAWINGS

The invention will be better understood in the light of the detailed description which will follow, with reference to the attached drawing in which the figures depict one particular embodiment of the invention.

DETAILED DESCRIPTION OF THE INVENTION

Figure 1:
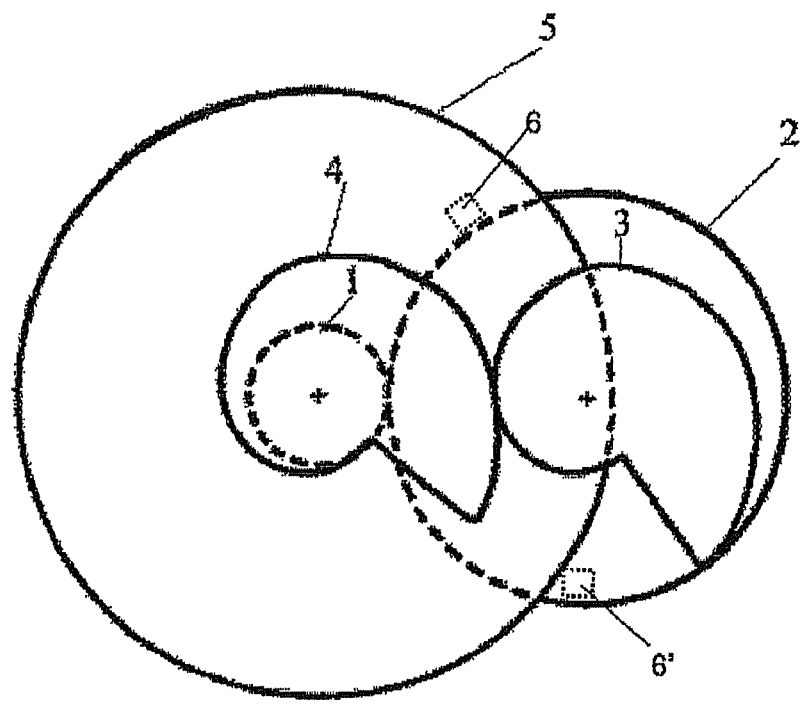

FIG. 1 depicts a view of the active part of the reduction gearset from the output side, operating in the clockwise direction. The small pinion 1 is the input pinion. It acts on the large pinion 2, in this example depicted with a reduction ratio of 3 and which is axially secured to a driving gear 3 which in turn drives a driven gear 4 symmetric with the gear 3 and having a pitch curve which is a portion of a logarithmic spiral the ends of which have been smoothed using arcs of a circle. The radii at the point of discontinuity are also in a ratio of 3 and the rule of the sum of the radii remaining constant and equal to the distance between centers for equal curved abscissa values from the ends is met. The gear 4 is the output gear. A circular plate 5 acts as a wheel carrier for the wheels 2 and 3 and can rotate only in the clockwise direction by virtue of a device which has not been depicted. The small input pinion 1, the wheel carrier plate 5 and the output gear 4 are not secured to the main axis. The large pinion 2 and the gear 3 are secured to the intermediate shaft guided freely by the plate 5.

The position depicted in FIG. 1 corresponds to an intermediate position with a reduction ratio of 3×2=6.

Figure 2:
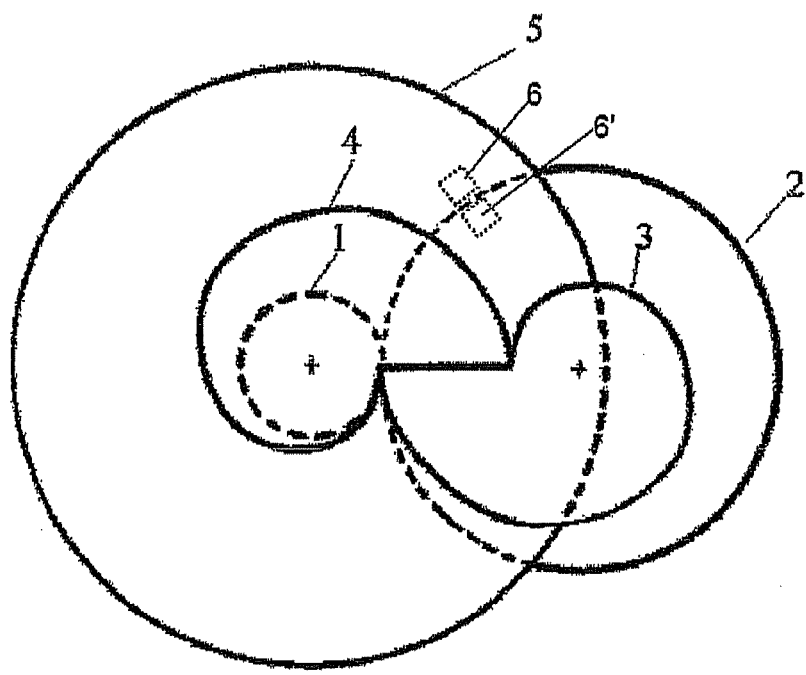

FIG. 2 depicts the position of the discontinuity corresponding both to the start of the start-up phase with a reduction ratio of 3×3=9 and to the final blocked position with a reduction ratio of 3×½=1.

It should be noted that an end of the transient phase corresponds to the end of a rotation through 360° of the variable-radius gears and of the large pinion. A rotation-blocking device 6, 6', which may be positioned with no particular preference on any one of these three wheels, then stops the mechanism and the whole entity then rotates about the common input and output axis.

The invention claimed is:

1. A coaxial mechanical reduction gearset with a continuously decreasing reduction ratio, the comprising
    a plurality of variable-radius gears for a phase of starting up a rotary machine,
    wherein said gears have uniformly varying radii, the reduction ratio at the end of the start-up phase is 1:1 in direct drive, and the reduction gearset at that point then no longer has any internal moving part, and
    wherein the variable-radius gears are symmetric and exhibit a radius varying up to a maximum of the radii, wherein the reduction gearset comprises two pinions which have axes common to said gears and a respective radius, the ratio between said pinions being the same as the ratio between the maximum of the radii of the variable-radius gears; and
    a device which blocks the rotation of the variable-radius gears and pinions at the end of the start up phase at the minimum reduction point of 1:1 and enables the rotation for reengagement at the point of maximum reduction.

2. The reduction gearset as claimed in claim 1, wherein the variable radii of the gears have rates of variation that are functions of their angular positions.

3. The reduction gearset as claimed in claim 1, wherein said variable-radius gears are longitudinally offset; and said pinions are distributed about the one of said axes that serves as common input and output axis.

4. A rotary machine comprising a reduction gearset according to claim 1.

\* \* \* \* \*